Patented Oct. 22, 1940

2,218,713

UNITED STATES PATENT OFFICE 2,218,713

PROCESS OF TREATING PEANUTS

William W. Kelly, Cleveland, Ohio, and Richard Perry Tolle, Detroit, Mich.

No Drawing. Application November 15, 1938,
Serial No. 240,534

3 Claims. (Cl. 99—126)

This invention relates to an improved process for the treatment of peanuts in the shell.

It is a matter of common knowledge that after peanuts have been roasted, they will soon absorb moisture and the kernels will become soggy and undesirable unless kept in a warm, dry place with sufficient heat to repel moisture. For this reason, the sale of peanuts in the shell is more or less local and they must be sold very quickly as they can not be shipped any distance or kept any length of time, since most places are not equipped with means for preserving peanuts in fresh condition, especially in the summer season, and it means a loss after the peanuts have picked up moisture and become soggy.

Therefore, it is the object of our invention to devise a process for treating roasted peanuts in the shell so as to preserve them in freshly roasted condition and thereby increase their desirability and sale.

More specifically, our object is to create and seal within the shell at least a partial vacuum as a means of effectively accomplishing the preservation herein contemplated.

Another object is to devise such a process which will also add to the appearance of the peanuts and in this way also increase their sales appeal.

This invention contemplates also the provision of colored peanuts of various or multiple colors and with a moisture-proof coating, thereby increasing their sales appeal and preserving them in fresh condition.

More specifically, the object is to devise such a process that can be carried out by means of a simple, inexpensive operation and without any deleterious effect upon the peanuts themselves.

Other objects will appear from the following description and claims when considered together with the prevailing practical conditions herein briefly explained.

It is to be understood that the present form of disclosure and the modifications thereof as herein set forth are merely for the purpose of an understanding of the invention which might be varied without departing from the spirit thereof as set forth and claimed in the present specification.

In carrying out our invention, we propose first to roast the peanuts in the regular manner and then promptly, while the unshelled peanuts are in dry condition and still have the heat in them, apply coloring to the shells in any suitable manner. For instance, this may be done in the following manner. A cold solution of buttermilk, milk, soluble casein and any U. S. certified color or dye is sprayed or poured over the warm nuts in a tumbling pan in which they are tumbled together. The heat of the peanuts causes the solution to be partly absorbed by the cells of the porous shell before evaporation takes place. Then, upon evaporation of the solution, the casein remains as a coating which both seals the pores and holds the color in the shell. This amounts to sealing and coloring the shells of the nuts in a single operation.

As a further protection against absorption of moisture into the nuts, we propose to spray or otherwise apply a transparent or translucent wax, as for instance colorless or white paraffine, as a coating over the shells of the peanuts as above prepared. To the paraffine is added a small quantity of carnauba wax or any confectioner's glaze which is applied while the nuts are being tumbled.

The paraffine solution is applied to the colored peanuts as they are being tumbled in the pan or a drum or other such container so as to completely expose the shells of the peanuts to the solution and also permit the same, when cool, to contact each other for the purpose of developing a lustrous or glazed appearance without requiring any other treatment for this purpose.

There will be applied to the container only sufficient heat to ensure the paraffine remaining in solution long enough to be applied to the nuts. In fact, the peanuts which are comparatively cold will cause the paraffine to coat itself thereupon; and the rubbing of the peanuts together will cause the same to take on a sufficiently glazed condition to add still further to their appearance. Only sufficient solution will be employed to coat a given batch of peanuts so as to facilitate the coating and glazing operation. As soon as the peanuts are finally removed from the pan or drum, they will be in condition for packaging or display.

It will be observed that this treatment is applied to the peanuts promptly after the roasting operation and while they are still warm and in a dry condition and without the application of water. In fact, the purpose of this invention is to prevent the entrance of moisture to the inside of the shells after it has once been removed by the roasting operation. Neither is it necessary to apply heat to the peanuts except to keep the paraffine in solution.

Our process does not require the employment of any lacquer or the like for the purpose of developing a glazed appearance, as this is accomplished during the tumbling operation, as above explained. For this purpose, the peanuts must be dry as peanut shells are comparatively soft and fibrous and can not be subjected to the same treatment of heat and water which might be employed in the treatment of other nuts, but which would wear off the shells of peanuts and thus prevent the accomplishment of the desired result as herein contemplated. Furthermore, if water should be applied to the shells of peanuts, it would be absorbed and penetrate through the pores of the shells and render the kernels soggy, which is the very condition it is here desired to correct or prevent. Also, the presence of water in the pores of the peanut shells would repel the entrance of the paraffine and the purpose of this invention would be defeated. Thus the processes adopted in the cases of other nuts will not apply to peanuts which belong to the legume or pod family and have a soft, fibrous and porous shell, and it is important that our process can be performed without the use of water.

The presence of casein in solution with the color or dye while the peanuts are warm, prevents the entrance of both coloring and moisture to the inside of the shell. As a result, the kernel of the nut is promptly sealed against moisture which would render it soggy and it is also protected against any possible contamination by the coloring matter. In a word, our process comprises means of sealing the freshness and flavor of the freshly roasted kernel and, in addition, there is produced an exceedingly attractive appearance which may be carried as far as desired by the mixing and blending of colors. Different batches of peanuts may be given different colors and then they may be all mixed together.

As above stated, our method will create and seal within the shell at least a partial vacuum. This is due to the cooling effect of the cold solution upon the heated shell and the heated air therewithin, the shell and air therewithin being thus contracted and the reduced volume of air being trapped by the sealing material against the entrance of more air.

A modification of our invention consists in applying to the untreated shells of roasted peanuts a solution of colorless paraffine and any U. S. certified wax-soluble dye. In this manner, the peanut shells are sealed and colored by a single operation.

Another modification consists in applying to the untreated shells of roasted peanuts a coating of colored confectioners' glaze and tumbling the peanuts together so as to produce a glazed, colored, protective coating.

Our process does not entail any great expense and yet it is the means of saving considerable investment in roasted peanuts. Also, the sale of peanuts in the shell is greatly encouraged both to the retailer and the consumer, both because of their sealed-in freshness and their attractive appearance.

What we claim is:

1. The process of treating peanuts in the shell, consisting in roasting the same so as to expel the moisture therefrom, and then applying simultaneously thereto while in dry condition a combined coating of casein and coloring matter so as to seal the pores of the shell and add to the appearance thereof.

2. The process of treating peanuts in the shell, consisting in roasting the same so as to expel the moisture therefrom, and then applying thereto while in dry condition a coating of casein and coloring matter dissolved therein so as to seal the pores of the shell and add to the appearance thereof.

3. An improved food product consisting of a roasted peanut having the outer surface of its shell coated with casein and a coloring matter dissolved therein.

WILLIAM W. KELLY.
RICHARD PERRY TOLLE.